Feb. 6, 1940.　　　J. C. GLAUM, JR　　　2,189,140
GAS CUTTING MACHINE
Filed April 2, 1938　　　3 Sheets-Sheet 1

Inventor:
John C. Glaum, Jr.
By Gillson, Mann & Cottys
Attys.

Feb. 6, 1940.   J. C. GLAUM, JR   2,189,140
GAS CUTTING MACHINE
Filed April 2, 1938   3 Sheets-Sheet 2
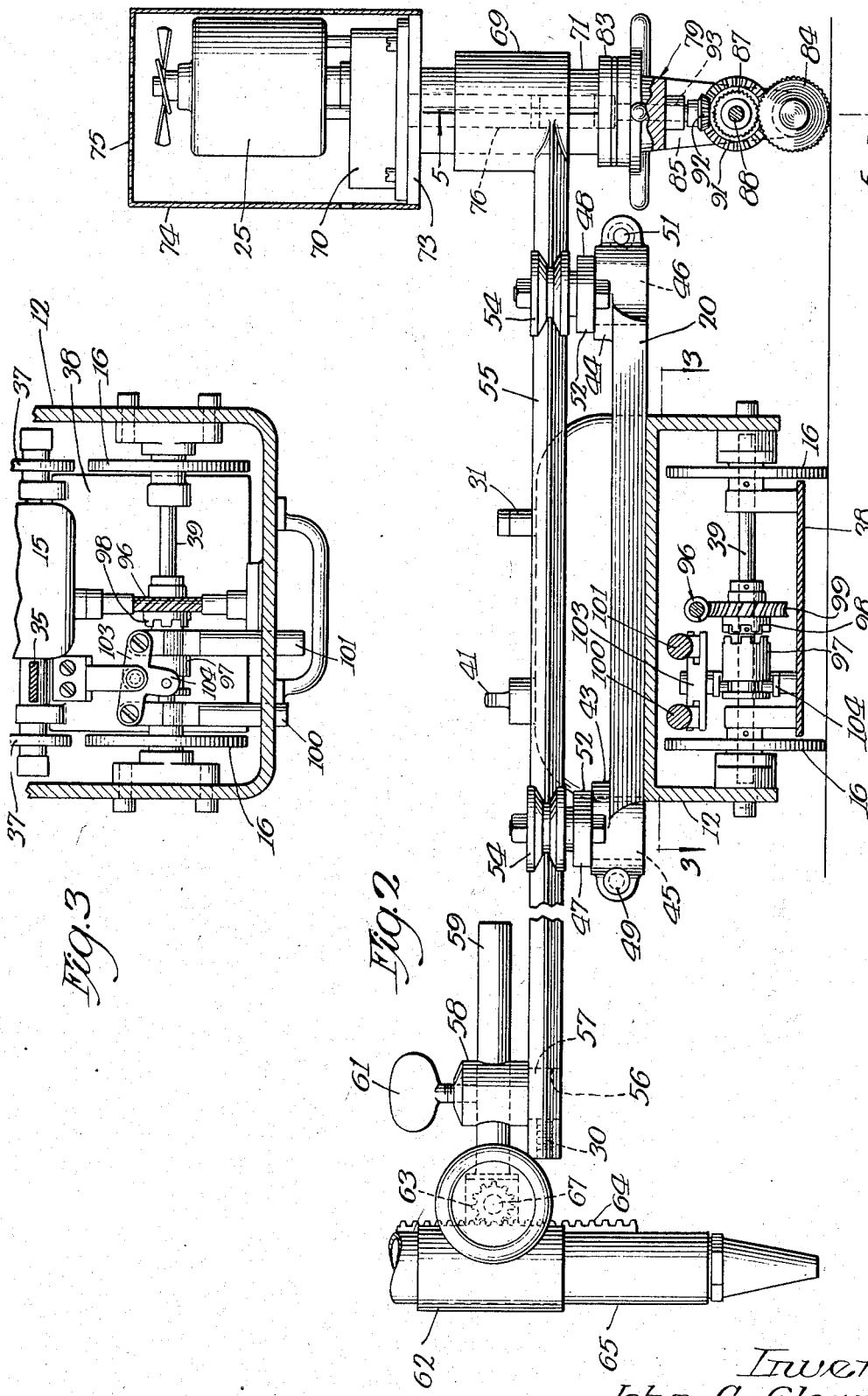

Feb. 6, 1940. J. C. GLAUM, JR 2,189,140
GAS CUTTING MACHINE
Filed April 2, 1938 3 Sheets-Sheet 3
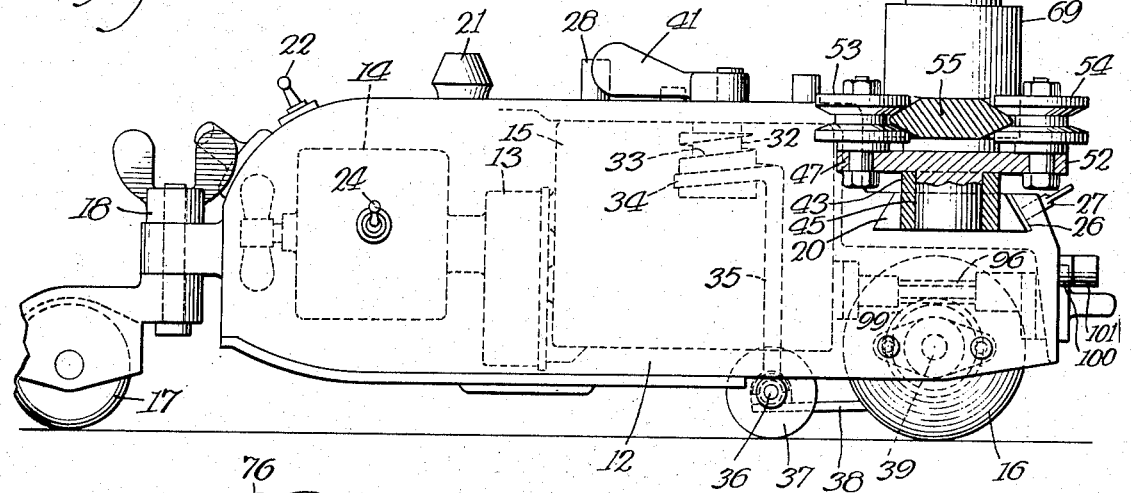
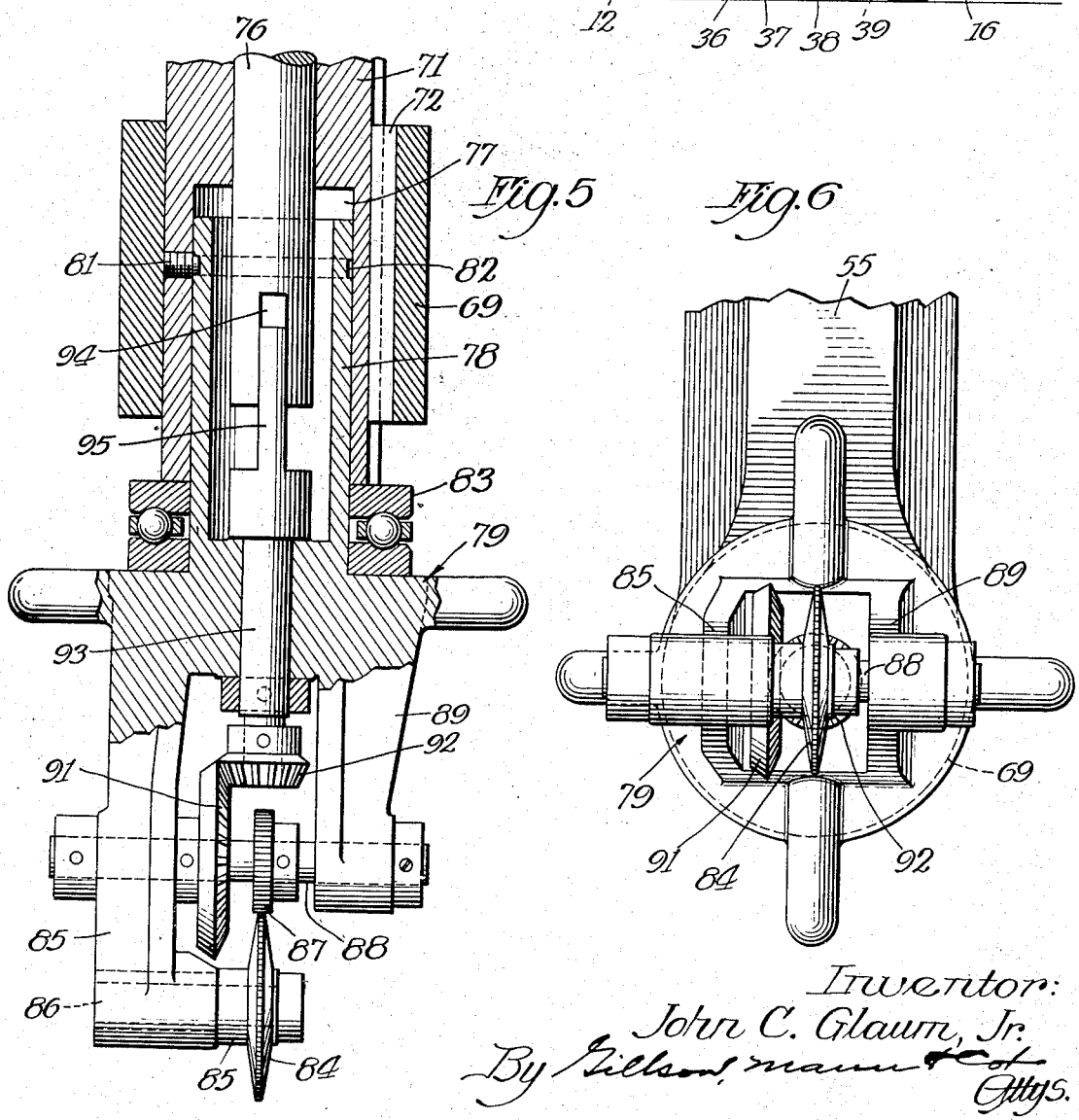
Inventor:
John C. Glaum, Jr.
By Gillson, Mann &Co
Attys.

Patented Feb. 6, 1940

2,189,140

UNITED STATES PATENT OFFICE 2,189,140

GAS CUTTING MACHINE

John C. Glaum, Jr., Chicago, Ill., assignor to Compressed Industrial Gases, Inc., a corporation of Delaware Application April 2, 1938, Serial No. 199,553

5 Claims. (Cl. 266—23)

This invention relates to gas cutting machines and more particularly to the type in which the torch is mounted on a motor driven carriage of the like machine.

One of the objects of the invention is the provision of a new and improved gas cutting machine having novel means for moving the gas cutting torch.

Another object of the invention is the provision of a new and improved attachment for a gas cutting machine having novel means for guiding the gas cutting torch according to a predetermined pattern or design.

A further object of the invention is the provision of a new and improved gas cutting machine having novel means for tracing a design for causing the gas cutting torch to duplicate such movement for cutting along lines duplicating the pattern.

Another object of the invention is the provision of a new and improved gas cutting machine having novel means for moving the torch that is simple in construction, composed of a minimum number of moving parts, that may be readily assembled and that is easily manipulated when in use.

Other and further objects and advantages will appear from the following description taken in connection with the accompanying drawings, in which—

Fig. 2 is a transverse cross-section of the apparatus shown in Fig. 1;

Fig. 3 is a section on the line 3—3 of Fig. 2;

Fig. 4 is a side elevation of the apparatus showing parts in section;

Fig. 5 is a section on the line 5—5 of Fig. 2; and

Fig. 6 is a bottom plan view of the construction shown in Fig. 5.

Figure 1:
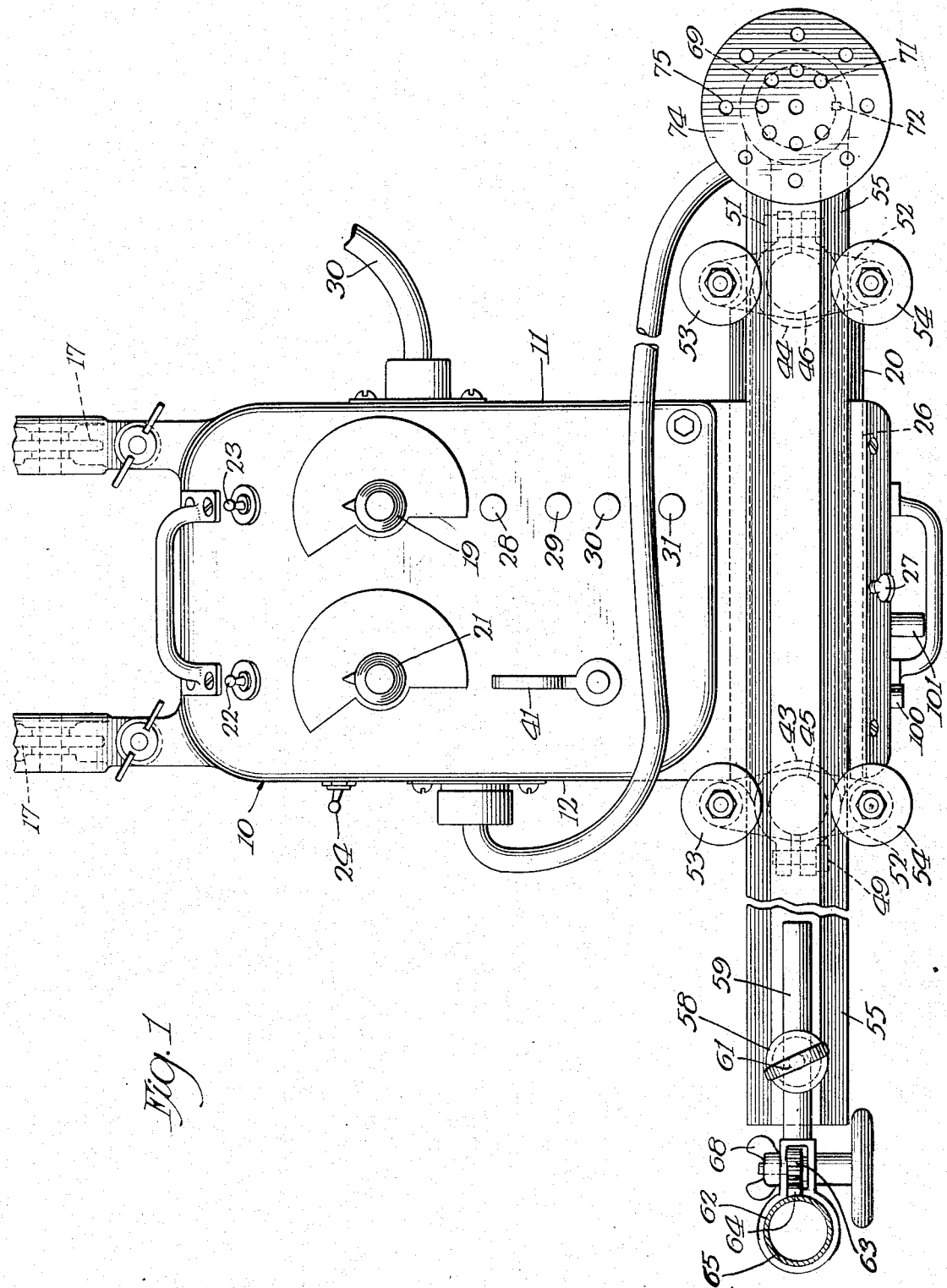
Fig. 1 is a plan view of a gas cutting apparatus showing the invention in position thereon.

It is common practice in gas cutting machines to provide a carriage having attached thereon an adjustable torch supporting arm for carrying the torch. The carriage is provided with means for driving the same for carrying the torch across the work that is being operated upon. It is difficult with such a construction to make angular, curved, and irregular cuts due to the difficulty in manipulating the machine.

The present invention seeks to remedy this defect by the provision of an attachment which is provided with means for guiding the torch independently of the driving mechanism for the carriage.

It has been proposed to employ gas cutting devices mounted on carriages that may be moved and that have movable arms for moving the torch in cutting the designs desired or in making the desired directional cuts, but in such designs the lines along which the cuts are to be made must first be drawn on the work on which the cut is to be made and the torch made to follow those lines while in operation. Such a procedure is objectionable because of the unnecessary time consumed if it is desired to duplicate the cuts or articles since the design must be duplicated for each article made. The present invention is designed to obviate the necessity for this duplication of work. According to the present invention, the design desired is drawn on a suitable plane surface, to form what, for convenience be termed a pattern which may be made on a wooden composition or paper board or plate or the like, and the torch guided over the metal by causing a suitable tracer wheel to follow the design or pattern as outlined on the board or plate thus causing the torch to cut out the article to correspond with such design. In this way, any number of articles substantially identical may be easily and readily cut out from the metal stock by causing the tracer to follow the lines of this same pattern.

Referring now to the drawings, the reference character 10 designates a gas cutting apparatus comprising a carriage 11 which is provided with an inverted casing 12 within which is mounted the driving mechanism 13, the motor 14 and housing 15 containing the change speed mechanism. The apparatus is substantially the same as that disclosed in Glaum et al., No. 2,040,478 of May 12, 1936, and is provided with driving wheels 16 at its forward end and with the casters 17 swivelled as at 18 at the rear end of the casing.

The motor 14 is of the universal type as in the patent and the current supplied to the motor through the lead 30 is controlled by the rheostats 19 and 21. By the use of the rheostat 19, the voltage is maintained substantially at a predetermined amount, say around 110V, while with this constant voltage the rheostat 21 which may be calibrated to indicate speed in feet per second, may be adjusted to obtain the desired speed. A pair of switches 22 and 23, Fig. 1, are provided for obtaining forward and reverse movement of the carriage. An additional switch 24 is employed for opening the circuit through the motor 14 and for closing the same through a motor 25 carried by the attachment and vice versa as will presently appear.

The casing is provided with a dove-tailed groove 26, see Fig. 4, within which a slide support 20 may be adjustably mounted as in the patent. A set screw 27 in the wall of the groove 26, Fig. 4, is provided for holding the slide member at any adjusted position and is similar to that disclosed in the patent.

The apparatus is provided with change speed mechanism which may be operated by the push buttons 28, 29, 30 and 31. Since the change speed mechanism is the same as that shown in the patent, it is not thought necessary to show and describe the same.

Suitable means are provided for elevating the forward end of the casing so as to bring the driving wheels 16 out of contact with the surface over which the device is moving to provide what may be considered free wheeling. This means comprises the stub shaft 32, Fig. 4, having a spiral thread 33 thereon for engaging a threaded lateral extension 34 on a supporting standard 35, the lower end of which is secured to an axle 36 having the wheels 37 thereon. The axle 36 is secured to the rear end of a lever arm 38 in the forward end of which is journalled the axle 39 of the wheels 16. The stub shaft 32 is adapted to be turned by a lever arm 41 extending above the casing 12 of the carriage for lowering the arm 38 and wheels 37 for raising the front end of the carriage and with it the wheels 16. Since the construction thus far described, except for the switch 24, is substantially the same as that disclosed in the patent referred to above, it is not thought necessary to further illustrate or describe the carriage in detail.

The attachment, which is adapted to be applied to the carriage, will now be described. This attachment comprises the slide support 20 having the clamping sockets 43 and 44 at the ends thereof. These sockets are adapted to receive downwardly extending studs 45 and 46 on the carriers 47 and 48, respectively. The studs are adapted to be clamped in position by suitable screws 49 and 51 as shown more clearly in Figs. 1 and 2 of the drawings. The carriers 47 and 48 each comprises a base plate 52 having a pair of grooved rollers 53 and 54, Fig. 4, secured to each end thereof in spaced relation on vertical spindles carried by said plates. A slide bar 55 having tapered side edges for engaging the grooves in the rollers 53 and 54 is slidably held between said rollers. The slide bar 55 is free to move longitudinally between the rollers and is provided on one end with an opening 56 for receiving the reduced lower end 57 of an arm support 58. The arm support 58 is provided with an opening through which a torch supporting arm 59 is adapted to slide. The arm 59 is held in adjusted position by a set screw 61 which is adapted to clamp the arm within the arm support. This arrangement permits the arm to be rotated or slid longitudinally to any desired position. It is held in adjusted position by an Allen set screw 30, Fig. 2.

The outer end of the torch supporting arm 59 is provided with a torch supporting sleeve 62. The sleeve 62 is provided with a pinion 63 which is adapted to engage a rack 64 on the torch 65. The pinion is adapted to be rotated by a hand wheel 66 for adjusting the vertical position of the torch 65. The pinion 63 is mounted on a shaft 67 extending through a slotted portion of the outer end of the arm 59 as shown more clearly in Fig. 1 of the drawings.

The end of the slide bar 55 opposite the torch 65 has rigidly mounted thereon or integral therewith a sleeve 69 through which is slidably mounted a standard 71, see Fig. 5. The standard and sleeve are provided with complementary grooves in which is mounted a key 72, Fig. 5, which will permit the standard 71 to move vertically but will hold it from rotating.

Suitably mounted on this standard is a tracing mechanism and a motor for operating the same. As shown, the upper end of the standard has mounted thereon a base 73 on which is mounted the motor 25. A suitable casing 74, having ventilating openings 75, encloses the motor and is secured to the base 73. The standard 71 has an axial bore and a driving shaft 76, operated by the motor 25 through conventional reduction gearing in the housing 70, extends through this axial opening for operating the tracing mechanism as will presently appear.

The lower end of the standard 71 is provided with a counterbore 77 within which is rotatably mounted the upper reduced end or shank 78 of the tracing head 79. The reduced end 78 is held in the counterbore or socket 77 in any suitable manner as by means of a threaded plug 81 within the standard 71 having a reduced portion engaging an annular groove 82 extending about the shank 78.

Suitable antifriction bearings 83 are provided between the ends of the standard and the head 79 so that the head 79 may be free to be rotated about its axis.

The tracer mechanism is mounted on the head and comprises a rotating tracer element 84 mounted on an arm 85 extending downwardly from the head 79. The arm 85 is provided with a laterally extending shaft 86 on which the tracer member 84 is journalled. The tracer member 85 is tapered from its hub 85 toward its periphery from each side and its periphery is provided with teeth 86 which are adapted to engage a spur gear 87 fixed to a shaft 88 which in turn is journalled in the arm 85 and the lower end of a second arm 89 extending downwardly from the head 79 parallel with the arm 85. The teeth 86 on the tracer element afford traction for the tracer element 84 in tracing the pattern for cutting the desired design. Fixed to the shaft 88 is a bevel gear 91 which engages a pinion 92 carried by the lower end of a stub shaft 93 which in turn is journalled in an axial bore in the head 79. The upper end of the stub shaft 93 is connected to the drive shaft 76 in any suitable manner. In the form shown, the drive shaft 76 is provided with a slot 94 in its lower end which is adapted to receive the upper flattened end 95 of the stub shaft 93.

It is desired that when the tracer mechanism is being used, the carriage be permitted to move freely. In order that the resistance to the movement of the carriage be reduced to a minimum, means are provided for declutching the entire driving mechanism for the wheels 16. As shown, this clutch, when operated, will permit the rotation of the wheels 16 and axle 39 independently of the worm and gear drive 96. In the form of the construction disclosed, the movable section 97 of the jaw clutch is slidably keyed to the shaft 39 and is adapted to interlock with the other section 98 of the clutch which is rigid with the worm gear 99 of the drive 96 and is loose on the shaft or axle 39. The clutch element or section 97 is adapted to be operated by a pair of push buttons 100 and 101 which extend to the exterior of the front of the carriage as shown in Figs. 1 and 2. These buttons are connected to a cross bar 103 connected to a pivoted clutch yoke 104 which is adapted to move the clutch member 97 into and out of clutching engagement with the jaw of the other clutch section 98. When it is desired to use the attachment, the button 100 is pushed to disengage the clutch jaws and operate the electric switch to open the circuit through the motor 14 and close the same through the motor 25.

It will thus be seen that when the motor 25 is in operation, it will rotate the shaft 67 and through the gearing will rotate the tracer member 84. The tracer member 84 may be caused to follow any pattern or design and inasmuch as the slide member 55 is free to slide transversely of the carriage and the carriage is free to move at right angles to the direction of movement of the arm 55, the movement of the tracer member 84 will cause a corresponding movement of the torch 66 and describe any line or figure desired.

It is thought from the foregoing, taken in connection with the accompanying drawings, that the operation and construction of my device will be apparent to those skilled in the art and that changes in size, shape or proportion may be made without departing from the spirit and scope of the appended claims.

I claim as my invention:

1. In a gas cutting apparatus, a carriage movable longitudinally of its center line, a gas torch, means movable transversely of said center line for supporting said torch on said carriage, a tracer mechanism connnected to said means, and means for operating said tracing mechanism independently of said carriage or simultaneously therewith for moving said torch, said means comprising a tracer wheel having gear teeth on its periphery for increasing its traction and gears driven by the tracer mechanism and engaging said teeth for rotating said wheel.

2. An attachment for gas cutting carriages having a slide groove extending transversely thereof, a supporting member adapted to be slidably mounted in said groove to slide transversely of said vehicle, a bifurcated standard detachably mounted in sockets at each end of said slide member, grooved rollers mounted on the furcations of said standard, a slide bar having tapered edges engaging the grooves in said rollers, a torch carried by one end of said slide bar, tracing mechanism carried by the other end of said slide bar having a free limited vertical movement relative thereto, said mechanism comprising a tracing wheel having peripheral gear teeth, a motor and driving mechanism including a gear engaging the teeth of said driving wheel for operating the same from said motor, and means including handle members for turning said tracing wheel about a vertical axis for tracing a predetermined design for causing said torch to cut metal corresponding to said design.

3. An attachment for gas cutting carriages comprising a support adapted to be mounted on said carriage, a slide member slidably mounted on said support, grooved rollers engaging the side edges of said slide member, a standard adjustable about a vertical axis on the outer end of said slide member, a torch supporting arm rotatably and slidably mounted in said standard, a torch carried by said arm, tracing mechanism mounted on the opposite end of said slide member, said mechanism comprising a vertically movable standard, a motor mounted on the upper end of said standard, a caster element swivelled in the lower end of said standard, a tracing wheel journalled in the lower end of said caster member, said wheel having gear teeth on its periphery, a spur gear engaging the teeth on said wheel, a bevel gear rotatable with said spur gear, a pinion for operating the bevel gear, and a shaft operated by said motor for turning said pinion, said shaft extending axially of said caster member whereby said tracing wheel may be rotated about a vertical axis for tracing a predetermined design.

4. In a gas cutting apparatus, a carriage having a slideway extending transversely thereof, a slide support slidably mounted in said slideway and detachable therefrom, means for rigidly securing said support in adjusted position in said slideway, said support having a contractible vertical socket at each end thereof, carriers detachably mounted in said sockets, grooved guide rollers provided with vertical axes mounted on said carriers, a slide bar having its side edges engaged by said grooved rollers, a torch, means for mounting said torch on one end of said slide bar, means for raising and lowering said torch, means for adjusting said torch about a horizontal and about vertical axes, and tracer mechanism on the opposite end of said slide bar.

5. In a gas cutting apparatus provided with a carriage having wheels thereon and having an arm freely slidable transversely of the carriage and a torch supported on said arm, the combination of a tracer head comprising a standard adjustably mounted on said arm, a tracer member journalled on said standard and having gear teeth on the periphery thereof, a power shaft and gear mechanism between said shaft and member and meshing with said teeth for operating said member from said shaft, and means for operating said shaft, said teeth being adapted to frictionally engage the surface of the pattern for guiding the movements of said torch.

JOHN C. GLAUM, Jr.